US010743556B2

(12) United States Patent
Puigferrat et al.

(10) Patent No.: US 10,743,556 B2
(45) Date of Patent: Aug. 18, 2020

(54) LACTOSE-REMOVING MILK PROCESS FOR LACTOSE-FREE MILK PRODUCTION

(71) Applicant: COMERCIALIZADORA DE LACTEOS Y DERIVADOS, S.A. DE C.V., Gomez Palacio, Durango (MX)

(72) Inventors: Ricardo Arista Puigferrat, Coahuila (MX); Daniel Isaac Valenzuela Rodriguez, Coahuila (MX); Juan Carlos de Santiago Ubaldo, Coahuila (MX); Rocio Leyva Jarquin, Coahuila (MX); Jose Ángel Martinez Gallegos, Coahuila (MX)

(73) Assignee: COMERCIALIZADORA DE LACTEOS Y DERIVADOS, S.A. DE C.V., Gomez Palacio (MX)

( * ) Notice: Subject to any disclaimer, the term of this patent is extended or adjusted under 35 U.S.C. 154(b) by 432 days.

(21) Appl. No.: 14/927,624

(22) Filed: Oct. 30, 2015

(65) Prior Publication Data
US 2016/0174586 A1    Jun. 23, 2016

(30) Foreign Application Priority Data

Dec. 18, 2014    (MX) .................... MX/a/2014/015894

(51) Int. Cl.
*A23C 9/142*  (2006.01)
*A23C 9/15*   (2006.01)

(52) U.S. Cl.
CPC .......... *A23C 9/1422* (2013.01); *A23C 9/1427* (2013.01); *A23C 9/15* (2013.01); *A23C 2210/206* (2013.01)

(58) Field of Classification Search
CPC ....... A23C 9/1422; A23C 9/1427; A23C 9/15; A23C 2210/206
See application file for complete search history.

(56) References Cited

U.S. PATENT DOCUMENTS

| 2005/0196508 | A1* | 9/2005 | Wang | A23C 9/1422 426/580 |
| 2005/0214409 | A1* | 9/2005 | Tossavainen | A23C 9/1206 426/34 |
| 2007/0166447 | A1* | 7/2007 | Ur-Rehman | A23C 9/1206 426/580 |

(Continued)

OTHER PUBLICATIONS

"How Do We Eliminate Lactose . . . ?" 2019. http://organicvalley.custhelp.com/app/answers/detail/a_id/201/kw/lactose%20free.*

*Primary Examiner* — Anthony J Weier
(74) *Attorney, Agent, or Firm* — Polsinelli PC

(57) ABSTRACT

The present invention relates to dairy and milk treatment industries for obtaining lactose-free milk and assessment of byproduct in particular, particularly to milk treatment industry through different separation means such as micro and nanofiltration equipment. One of the purposes of this invention is to provide a delactosed or lactose-free milk with sensory profile equivalent to a normal pasteurized milk using essential separation steps to reduce product costs. Another purpose of this invention is to determine the effect of milk natural components concentration on organoleptic properties to achieve the first purpose of this invention. Another purpose is to determine percentage between retentate and permeate to get a sensory profile equivalent to a normal pasteurized milk.

19 Claims, 1 Drawing Sheet

(56) References Cited

U.S. PATENT DOCUMENTS

| | | | |
|---|---|---|---|
| 2010/0055286 A1* | 3/2010 | Tikanmaki | A23C 9/1206 426/580 |
| 2010/0055289 A1* | 3/2010 | Kallioinen | A23C 9/1206 426/587 |
| 2010/0215828 A1* | 8/2010 | Tossavainen | A23C 3/033 426/583 |
| 2011/0059220 A1* | 3/2011 | Tossavainen | A23C 9/1206 426/580 |
| 2013/0230623 A1* | 9/2013 | Sibakov | A23C 9/1206 426/42 |

* cited by examiner

LACTOSE-REMOVING MILK PROCESS FOR LACTOSE-FREE MILK PRODUCTION

CROSS REFERENCE TO RELATED APPLICATIONS

This application is claims priority to Application No. MX/a/2014/015894 filed in Mexico on Dec. 18, 2014 under 35 U.S.C. § 119. The entire contents of this application is hereby incorporated by reference.

FIELD OF THE INVENTION

The present invention relates to dairy and milk treatment industries for obtaining lactose-free milk and assessment of byproduct in particular, particularly to milk treatment industry through different separation means such as micro and nanofiltration equipment.

BACKGROUND OF THE INVENTION

After some time, it has been observed men and women who have trouble digesting lactose, disaccharide consisting of glucose and galactose. This situation can cause mild digestive problems, but also stronger problems. It has been attempted to solve this problem in several ways.

Furthermore, it is a high percentage tendency of the population, as can be seen in soft drinks by reducing carbohydrate intake in general and sugars in particular.

An alternative is to provide the person who has lactose intolerance a non-bender lactose enzyme, externally and by oral ingestion prior to the consumption of any dairy product. This solution is cumbersome and requires some planning and discipline by consumer. These features are not in target audience of a product to be marketed massively.

Other option is to apply lactase enzyme into milk fluid as a process for obtaining a product for direct consumption or for preparation of various milk derivatives to ensure low-lactose content.

These processes using lactase into the product provides a sweetness increased by the amount of galactose obtained, resulting an undesirable product by consumer.

U.S. Pat. No. 5,334,399 refers to a solution to solve the problem adding potassium chloride to the product where enzymatic hydrolysis was performed. It is a practical solution, but often not allowed for breach of official standards in some countries.

Moreover, said procedure does not allow the assessment of an unwanted component which remains in said product and a process to remove said component to contain more advantages.

Some of said processes use equipment with membranes (filters) of different size (pore size) for different filtration processes such as ultrafiltration. Depending on the pore size, filter becomes more selective as follows:

1. Microfiltration. Used to retain particles according to their size such as bacteria and spores. Let through proteins, fat, sugars, amino acids, minerals and water.
2. Ultrafiltration. Used to retain particles according to their size such as proteins and fat. Let through sugars, amino acids, minerals and water.
3. Nanofiltration. Used to retain particles according to their size such as sacarose or granulated sugar. Let through minerals and water.
4. Reverse osmosis. Let through water and simple minerals.

Thus, it is not possible to determine a milk treatment process for lactose-free milk with similar organoleptic properties such as ultrapasteurized milk without lactose-free process.

A process known currently comprising the steps of:

Equipment use membranes capable to perform microfiltration, ultrafiltration, nanofiltration and reverse osmosis processes to separate milk components.

The process for producing lactose-free or low-lactose milk is as follows:

Subjecting skim or low-fat milk through ultrafiltration process to obtain a retentate and permeate.

UF permeate is then subjected to nanofiltration process to obtain equally said retentate and permeate.

A mixed UF retentate and NF permeate is performed.

UF and NF processes can perform a partial or even near elimination of lactose content where also part of minerals are lost. This mixture then is subjected to an enzymatic hydrolysis process using β-galactosidase enzyme to reduce lactose content generating glucose and galactose.

Also can perform reconstitution of milk using UF retentate adding water to protein desired level or including reverse osmosis process to concentrate minerals of NF permeate and used for milk reconstitution.

This process provides milk with strange organoleptic characteristics for a normal milk without considering this situation, besides de possibility of using operations which increase the production process.

Any invention that refers the necessary steps (micro, ultra or nano filtration and reverse osmosis) to achieve a lactose-free process for a delactosed or lactose-free milk with a sensory profile equivalent to a pasteurized milk (lactose milk), a partial removal of lactose by physical means and then removing the remaining lactose using lactase enzyme (β-galactosidase enzyme) and obtaining a fully lactose as byproduct, it contributes a non-existent technical knowledge to the state of the art for its protection by a patent.

Patent No. CA2701066, Vernazza, Francesco, refers to a method to obtain low-fat milk comprising at least two steps: first step milk is subjected to an ultrafiltration process to produce an ultrafiltration permeate and retentate after said process and; a second step wherein said ultrafiltration permeate is subjected to a nanofiltration process to produce a nanofiltration permeate and a nanofiltration concentrate after said process. Nanofiltration permeate is continuously recycled directly to the nanofiltration operation to dilute retentate from ultrafiltration and to obtain low-fat milk therefrom. This method does not consider physicochemical conditions to achieve milk with specific organoleptic characteristics.

Mexican patent No. PA/a/2004/011243, Janne Sahlstein, refers to a procedure for producing lactose-free milk products. Process of said invention is characterized by subjecting whole milk to ultrafiltration (UF), nanofiltration (NF) and reverse osmosis concentration, followed by the addition of salt to the UF retentate. Disadvantages of said method is the addition of salt to ultrafiltration retentate adding concentration by reverse osmosis becoming said method more expensive.

Mexican patent No. PA/a/2005/002049 refers to a method for separating milk components, comprising the steps of: passing milk in one-direction-flow through a filtration apparatus; a first step of milk filtration by ultrafiltration means for producing a first liquid filtered and a first concentrated, wherein lactose content of first filtered does not exceed 5.5% by weight; a second step of milk filtration by nanofiltration of first liquid filtered by nanofiltration means for producing a second liquid filtered and a second concentrated, wherein lactose content of second filtered does not exceed 0.15% by weight; a third step of milk filtration by reverse osmosis of second liquid filtered for producing a third liquid filtered and a third concentrated, wherein lactose content of third concentrated does not exceed 0.06% by weight; and wherein first filtered, second filtered and third filtered are removed from filtration apparatus through a first output, a second output and a third output respectively. Said patent contains reverse osmosis.

U.S. Pat. No. 8,445,052, Holst et. al., refers to a process for producing lactose-free or substantially lactose-free milk, preferably without adding water, and the resultant product. Said process comprising the steps of: a) ultrafiltration of original milk for obtaining a first permeate and a first retentate; b) nanofiltration of said first permeate for obtaining a second permeate and a second retentate; mixing first retentate with second permeate for obtaining a mixture; and d) hydrolyze remaining lactose in said mixture for obtaining a hydrolyzed milk. Process provides a lactose-free product with original milk flavor. Said process does not consider the composition of fats, proteins and carbohydrates of original milk.

Processes present in state of the art have the following disadvantages: only used UF retentate and mixing directly retentate with soft water to achieve desired fat and protein levels, making these levels higher to obtain products with good sensory profile.

Also is a complicated and higher cost of operation process due to the application of 3 filtration steps: UF, NF and reverse osmosis.

Also adding flavor to achieve a product that according to Mexican standards, said product not categorized as milk but as flavored milk.

Also incorporate the use of more proteins, up from 3.5% being unaffordable for Mexican market.

Also are methods or processes with lower yields due to the water removal in product and does not return said water in filtration process.

Also said methods or processes use external salts for recovering of lost minerals which increases cost of product.

Also not considered recovery of mineral salts and possible aromatic compound total or partially responsible of milk flavor.

OBJECT OF THE INVENTION

One of the purposes of this invention is to provide a delactosed or lactose-free milk with sensory profile equivalent to a normal pasteurized milk.

Another purpose of this invention is to provide the above quality using essential separation steps to reduce product costs.

Another purpose of this invention is to determine the effect of milk natural components concentration on organoleptic properties to achieve the first purpose of this invention.

Another purpose is to determine percentage between retentate and permeate to get a sensory profile equivalent to a normal pasteurized milk.

Further purposes and qualities will be detailed through the present invention.

BRIEF DESCRIPTION OF THE INVENTION

In other words, the process object of this invention begins with standardization of milk to be treated.

Raw milk is standardized to the required fat level, setting a value from 1.4 to 2.2%, preferably from 1.5 to 2.1, even more preferably from 1.6 to 2.0%, even more preferably from 1.7 to 1.9% of butterfat. Meanwhile, protein level after standardization is as follows: a value from 2.9 to 3.7%, preferably from 3.0 to 3.6%, even more preferably from 3.1 to 3.5%, even more preferably from 3.2 to 3.4%.

Later, milk is subjected to UF process wherein a "milk-concentrate" retentate is obtained (from 4.7 to 5.3%, preferably from 4.8 to 5.2%, even more preferably from 4.9 to 5.1%), said retentate subsequently will be mixed with the permeate resulting from NF process. This concentration must be reached in retentate in ultrafiltration step to obtain level of lactose in reconstituted milk.

In the process of this invention, proportions in UF step are: 55 to 63%, preferably from 56 to 62%, even more preferably from 57 to 61%, even more preferably from 58 to 60% of retentate and; from 37 to 45%, preferably from 38 to 44%, even more preferably from 39 to 43%, even more preferably from 40 to 42% of permeate.

Permeate obtained in UF is subjected to NF process to obtain a retentate (water, lactose and minerals) and a permeate (water and minerals).

For NF step, process of this invention stablishes the following proportions: from 30 to 38%, preferably from 31 to 37%, even more preferably from 32 to 36%, even more preferably from 33 to 35% of retentate and; from 62 to 70%, preferably from 63 to 69%, even more preferably from 64 to 68%, even more preferably from 65 to 67% of permeate.

Diafiltration process is used primarily to streamline the recovery of minerals salts and aromatic compounds that provide flavor, it begins when lactose level is critical (lactose crystallization in membranes) in NF retentate, keeping lactose levels closed to said level avoiding diluted over the retentate.

In diafiltration only enough water is used to restore water lost during the process, such that by mixing UF retentate and NF permeate is obtained the same milk volume which it started only by obtaining a lower yield for protein adjustment necessary to provide better sensory profile. Mixing obtained from UF retentate and NF reconstituted milk permeate is then subjected to UHT process and then adding thereto enzyme needed by container to hydrolyze remaining lactose.

The use of UF permeate of milk causes a limitation in NF retentate concentration (between lactose and calcium), due to risk of crystallization on membrane, therefore it is recommended maintain a retentate concentration between 9 and 10° Bx, preferably from 10 to 11° Bx, even more preferably from 11 to 12° Bx, even more preferably from 12 to 13° Bx while diafiltration process is performed.

To generate a similar sweetness such as pasteurized milk during enzymatic hydrolysis, such step also part of process of this invention, in UF and NF steps should be removed from 35 to 40%, preferably from 36 to 39%, even more preferably from 37 to 38%; reconstituted milk should be from 2.7 to 3.5%, preferably from 2.8 to 3.4%, even more preferably from 2.9 to 3.3% and even more preferably from 3.0 to 3.2% of lactose.

Another parameter defining process of this invention is the proportion obtained from retentate and permeate in UF and NF processes. Said process has the following proportions: proportions in UF process are: from 55 to 63%, preferably from 56 to 62%, even more preferably from 57 to 61%, even more preferably from 58 to 60% of retentate; from 37 to 45%, preferably from 38 to 44%, even more preferably from 39 to 43%, even more preferably from 40 to 42% of permeate. For NF process: from 32 to 36%, preferably from 33 to 35% of retentate; from 62 to 70%, preferably from 63 to 69%, even more preferably from 64 to 68%, even more preferably from 65 to 67% of permeate.

Figure 1:
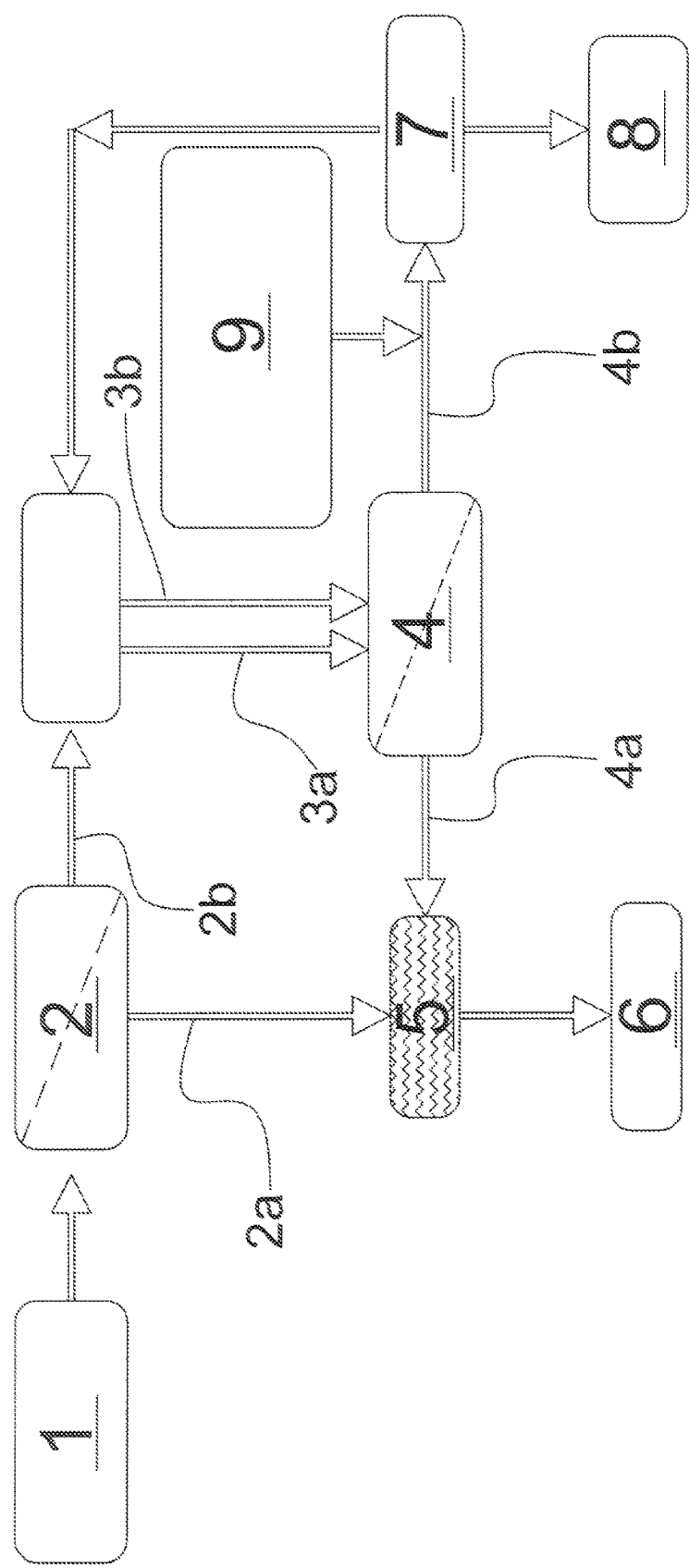
FIG. 1 shows process scheme of the present description, all the steps including.

A detailed description of the invention is next, relying on examples for this purpose is carried out.

DETAILED DESCRIPTION OF THE INVENTION

FIG. 1 shows a process scheme of the present invention, all the steps including. FIG. 1 shows standardized fat milk tank (1). Said milk is fed into ultrafiltration equipment (2), through broken line outlining the membrane. Line (2a) connecting retentate to tank (5). Line (2b) connects UF permeate to permeate tank (3).

Line (3a) carries permeate of permeate tank to NF equipment (4). Line (3b) carries permeate with addition of water stored into retentate-diafiltration water mixture tank (7). Tank (9) contains water that is injected to NF retentate.

A portion of the non-recirculated retentate is carried to the tank (8) wherein concentrated solution is concentrated.

NF permeate is carried to mixing tank (5) wherein UF retentate is mixing with said NF permeate to get delactosed milk which is carried to tank (6), said delactosed milk receives enzymatic cleavage of lactose step.

The first step in the process of this invention is to standardization of milk to be treated. Said standardization is accomplished with two milk components, fat concentration and protein concentration.

Raw milk is standardized to required fat level, i.e., setting a value from 1.4 to 2.2%, preferably from 1.5 to 2.1, even more preferably from 1.6 to 2.0%, even more preferably from 1.7 to 1.9% of butterfat.

Protein level after standardization is as follows: a value from 2.9 to 3.7%, preferably from 3.0 to 3.6, even more preferably from 3.1 to 3.5%, even more preferably from 3.2 to 3.4%.

Next step is ultrafiltration to get a UF permeate and a UF retentate. Permeate is carried to nanofiltration (NF) step. UF retentate is mixing with NF permeate. UF permeate is subjected to NF process to get a retentate (water, lactose and minerals) and permeate (water and minerals).

EXAMPLES

Example I

| Date | Test no. | Activities |
|---|---|---|
| Apr-21th-14 | P1 | Methodology:<br>❋ Use of skim milk (2 g/L).<br>❋ Total solids concentration (SC) up to 12.8% (8.26% protein) using ultrafiltration process (UF).<br>❋ Reconstitution of milk using retentate and soft water to initial protein values of milk (3.1%), using only 2.12% of lactose.<br>❋ Heat treatment of milk-UHT Process-<br>❋ Enzymatic hydrolysis (using β-galactosidase) of lactose remaining less than 1%. |

| Date | Test no. | Activities |
|---|---|---|
| | | Results:<br>❋ Product obtained has a milky and sweet diluted profile<br>Next steps:<br>❋ Raise the profile increasing fat level to 1.6%. |

In this example, skim milk has a butterfat content of 2 g/L. No nanofiltration has used and enzymatic hydrolysis of lactose remaining was less than 1%.

The result was undesirable because the product was very sweet and diluted.

Example II

| Date | Test no. | Activities |
|---|---|---|
| May 9th-14 | P2 | Methodology:<br>❋ Use of skim milk (2 g/L).<br>❋ Concentration (SC) up to 12.98% (8.14% protein) using UF process.<br>❋ Reconstitution of milk using retentate and soft water to initial protein values of milk (3.1%), using only 2.2% of lactose.<br>❋ Standardization up to 1.6% of butterfat (BF)<br>❋ Heat treatment of milk-UHT Process-<br>❋ Enzymatic hydrolysis of lactose remaining less than 0.5%.<br>Results:<br>❋ Product obtained has a dairy profile, more tan P1 but still less sweet diluted profile.<br>Next steps:<br>❋ Explore the possibility of reducing the use of soft water and reinstate salts and possible flavor compounds that are lost in UF permeate through the inclusion of nanofiltration (NF) process. |

In this example, skim milk had the same butterfat content on treated milk of 2 g/L. concentration through UF has noticeably same concentrations of milk compounds.

Product is less sweet than example 1, and has a dairy profile, however, has a thin consistency.

Example III

| Date | Test no. | Activities |
|---|---|---|
| May 21st-14 | P3 | Exploratory test process<br>To evaluate the feasibility of processing UF permeate with NF process, in order to improve the dairy product profile retrieving salts and possible flavor compounds, thus decreasing the use of soft water.<br>Methodology:<br>❋ Use of skim milk (2 g/L).<br>❋ Concentration (SC) up to 9.51% (4.2% protein) using UF process.<br>❋ Using UF permeate for processing by NF.<br>❋ Concentration of NF retentate up to 13.5° Bx max (the process stops at this point).<br>Results:<br>❋ It is feasible to perform NF process using UF permeate and decreasing use of soft water for reconstitution of milk without adding lactose to reconstituted product.<br>Next steps:<br>❋ To perform test using UF and NF processes. |

In this example, butterfat content on treated milk is the same, but concentration on final solids and protein is lower such that is less water with ultrafiltration step, because a nanofiltration step is applied to permeate.

It is feasible performed NF process using UF permeate and using less soft water for reconstitution of milk.

Example IV

| May 28th-14 | P4 | Methodology:
* Use of skim milk (2 g/L).
* Concentration (SC) up to 14.32% (8.58% protein) using UF process.
* Using UF permeate for processing by NF.
* Concentration of NF retentate up to 12% of lactose.
* Reconstitution of milk using UF retentate, NF permeate and soft water to initial protein values of milk (3.2%), using only 1.7% of lactose.
* NO standardization is performed at a level of 1.6% of butterfat for the purpose of comparing the product obtained against only UF (P1).
* Heat treatment of milk-UHT process-
* Enzymatic hydrolysis of lactose remaining less than 0.5%.
Results:
* Product obtained improves dairy profile using these two processes versus P1, but still less sweet and diluted.
Next steps:
* Establish minimum amount of remaining lactose in reconstituted milk having the same sweetness as initial milk.
* To identify the feasibility of using skim milk of 16 g/L.
* To determine whether additional homogenization and pasteurization processes retain more flavor compounds into fat globules. |

The result is still not acceptable, the product is diluted and sweetness is poor.

Example V

| Jun 18th-14 | P5 | Methodology:
* Use of skim milk (16 g/L).
* Pasteurization and homogenization of milk (72° C./16 s to 170 bar)
* Concentration up to 16.11% SC (8.7% protein) using UF process (see text in result section*).
* UF permeate processing through NF.
* NF retentate concentration up to 9.18% of lactose.
* Reconstitution of milk using UF retentate, NF permeate and soft water to initial protein values of milk (3.2%), with 2.525 of lactose (it had to standardize at this level of lactose*).
* PH adjustment using lactic acid, because acidity is lost during all filtration process.
* Heat treatment of milk-UHT process-
* Enzymatic hydrolysis of lactose remaining less than 0.5%.
Results:
* Product obtained has a better dairy profile, however sweetness is perceived slightly below to a pasteurized milk.
* Pasteurization and homogenization process does not contribute to the improvement of profile but also complicates operation and cost.
* There are major benefits using skim milk but:
*Using skim milk, curve use on rapid methods equipment (Milkoscan) are not suitable due outliers observed during UF process monitoring, because of this, the product was more concentrated in UF step obtaining values above.
Next steps:
* Develop a specific curve on Milkoscan to obtain reliable data during concentration process by opening with semi-skim milk.
* Explore the possibility of incorporating diafiltration process in NF step for improving mineral salts recovery and aromatic compounds, thereby eliminating the direct use of soft water. |

Example VI

| Jun 25th-14 | P6 | Exploratoriy testing process
Validate the curve drawn in Milkoscan equipment, monitoring data obtained with protein titration process. Explore diafiltration process during NF step to improve dairy profile of product and streamline the recovery of salts and possible aromatic compounds, thereby eliminate use of soft water directly in the reconstitution to get the same UF permeate volume.
Methodology:
* Use of skim milk (2 g/L).
* Concentration up to 10.54% SC (4.69% protein) using UF process.
* Processing UF permeate through NF and diafiltration.
* Concentration of NF retentate using diafiltration process when indicates 12-13° Bx in retentate avoiding exceed these values until recovering the same volume of UF permeate. The final NF permeate concentration is up to 7.26% of lactose.
* Reconstitution of milk using UF retentate and NF permeate diafiltered to initial protein values of milk (3.07%), using only 3.26% of lactose.
* Standardization performed a level of 1.6% of butter-fat.
* Heat treatment of milk-UHT process-
* Enzymatic hydrolysis of lactose remaining less than 0.5%
Results:
* Product obtained has a better dairy profile with a noticeable decrease when diluted and sweetness is similar to a raw milk.
* Proper functioning of generated curve for this concentration process is shown.
* Feasible and beneficial the use of diafiltration process is shown.
Next steps:
* To perform the process using semiskim milk.
* To use curve generated in Milkoscan for raw milk.
* To use diafiltration process in NF step. |

Product obtained has a better dairy profile, however, sweetness is lower than a pasteurized milk.

Example VII

| Jun 26th-14 | P7 | Methodology:
* Use of skim milk (16 g/L).
* Retentate concentration up to 14.96% SC (6.23% protein) using UF process and working pressure to 35 psi.
* UF permeate processing using NF and diafiltration. Final concentration of NF retentate using diafiltration to 9.32% of lactose (12.67% SC), up to 12° Bx during diafiltration (° Bx vary from 8 to 12). Working pressure on NF is up to 560 psi.
* Reconstitution of milk using UF retentate plus NF diafiltered permeate (soft water is removed) to initial protein values of milk (3.29%), remaining only 2.75% of lactose.
* Heat treatment of milk-UHT process- |

-continued

| | |
|---|---|
| | ❋ Enzymatic hydrolysis of lactose remaining less than 0.5%.<br>Results:<br>❋ Product obtained has better texture, dairy profile and same sweetness as pasteurized milk versus P6, but still has opportunity to optimize texture and sweetness.<br>Next steps:<br>❋ To improve sweetness level through optimize lactose level from 3.1 +/− 1% in reconstituted milk.<br>❋ To achieve lower ° Bx width variation during diafiltration process keeping values in upper limit, that is, between 12 and 13° Bx. |

Following was obtained:

Product obtained has better texture, dairy profile and same sweetness as pasteurized milk versus P6, but still has opportunity to optimize texture and sweetness.

Example VIII

| | | |
|---|---|---|
| Jul 1st-14 | P8 | Methodology:<br>❋ Use of semi skim milk (16 g/L).<br>❋ Retentate concentration up to 13.05% SC (5.02% protein) using UF process.<br>❋ UF permeate processing using NF and diafiltration.<br>❋ Final concentration of NF retentate using diafiltration to 7.66% of lactose (10.13% SC), up to 13° Bx during diafiltration (° Bx vary from 10 to 12.5).<br>❋ Reconstitution of milk using UF retentate plus NF diafiltered permeate to initial protein values of milk (3.26%), remaining only 3.27% of lactose.<br>❋ Heat treatment of milk-UHT process-<br>❋ Enzymatic hydrolysis of lactose remaining less than 0.5<br>Results:<br>❋ Product obtained has better dairy profile and same sweetness as pasteurized milk, optimizing texture but still has opportunity to optimize versus pasteurized milk.<br>❋ To achieve lower ° Bx width variation and close variation.<br>Next steps:<br>❋ To decrease ° Bx width variation during diafiltration process.<br>❋ Explore a reconstitution of milk to higher protein levels to optimize texture. |

Results obtained as follows:

Product obtained has better dairy profile and same sweetness as pasteurized milk, optimizing texture but still has opportunity to optimize versus pasteurized milk.

To decrease ° Bx width variation during diafiltration process but still close said variation.

Example IX

| | | |
|---|---|---|
| Jul 16th-14 | P9 | Methodology:<br>❋ Use 1.4% of fat milk because fat is increased in reconstituted milk depending on the desired concentration level in UF retentate.<br>❋ Retentate concentration up to 14.14% SC (5.81% protein) using UF process.<br>❋ UF permeate processing using NF and diafiltration.<br>❋ Final concentration of NF retentate using diafiltration to 9.59% of lactose (12.94% SC), up to 13° Bx during diafiltration (° Bx vary from 10.5 to 12.5). |

| | |
|---|---|
| | ❋ Two reconstitutions of at different levels of protein (3.2 and 3.5%) using UF retentate plus NF diafiltered permeate are performed, remaining only 2.91% of lactose in 3.2% of protein and 3.03% of lactose in 3.5% of protein, both with 1.6% fat.<br>❋ Heat treatment of milk-UHT process-<br>❋ Enzymatic hydrolysis of lactose remaining less than 0.5%.<br>Results:<br>❋ Products obtained have better dairy profile, better than 3.5% of protein and slight lack of texture.<br>❋ It is a better control of ° Bx amplitude.<br>Next steps:<br>❋ To perform reconstitutions of milk at different protein and fat levels (up to 1.8% keeping as low-fat milk) |

Products obtained have better dairy profile, better than 3.5% of protein and slight lack of texture.

Example X

| | | |
|---|---|---|
| Jul 24th-14 | P10 | Methodology:<br>❋ Use 1.4% of fat milk.<br>❋ Retentate concentration up to 14.07% SC (5.63% protein).<br>❋ UF permeate processing using NF and diafiltration.<br>❋ Final concentration of NF retentate using diafiltration to 9.08% of lactose (12.29% SC), up to 13° Bx during diafiltration (° Bx vary from 10.5 to 12.5).<br>❋ Three reconstitutions of at different levels of protein (3.2 protein and 1.6% fat, 3.2% protein and 1.8% fat, 3.5% protein and 1.8 fat) are performed, remaining only 2.97%, 2.97% and 3.11% of lactose respectively using UF retentate plus NF diafiltered permeate.<br>❋ Heat treatment of milk-UHT process-<br>❋ Enzymatic hydrolysis of lactose remaining less than 0.5%.<br>Results:<br>❋ Product obtained has better dairy profile due to the difference in fat level.<br>❋ Difference in protein is low between 3.2 and 3.5% compared with fat from 1.6 to 1.8%.<br>❋ Best products are from 3.2 to 3.5% of protein with 1.8% fat.<br>❋ Profiles of these products are similar sweetness and texture to pasteurized milk, whiter presentation and non-overcooked.<br>Next steps:<br>❋ To perform product with 3.3% of protein and 1.8% fat as final proposal. |

Protein difference is not as marked between 3.2 and 3.5% comparing fat between 1.6 and 1.8% found.

Example XI

| | | |
|---|---|---|
| Aug 14th-14 | P11 | Methodology:<br>❋ Use 1.4% of fat.<br>❋ Retentate concentration up to 14.66% SC (5.7% protein).<br>❋ UF permeate processing using NF and diafiltration.<br>❋ Final concentration of NF retentate using diafiltration to 9.68% of lactose (13.24% SC), up to 13° Bx during diafiltration (° Bx vary from 11 to 12.5).<br>❋ Two reconstitutions of at different levels of protein (3.3 and 3.5% of protein) with 1.8% fat are performed, | remaining only 3.13% and 3.14% % of lactose using UF retentate plus NF diafiltered permeate.

* Heat treatment of milk - UHT process-
* Enzymatic hydrolysis of lactose remaining less than 0.5%.

Results:
* Both products are similar sensory to a pasteurized milk, whiter presentation and non-overcooked. It is recommended 3.3% protein and 1.8% fat.

Best method known for applicant for carrying out the invention is that resulting from the present description.

This invention has been sufficiently described so that a person with ordinary skills in present state of the art can reproduce and obtain results mentioned in said invention. If any person may be able to make modifications not described in said invention, said modifications in a lactose-removing milk process for lactose-free milk production and byproduct use, said modifications must be within scope of invention.

What is claimed is:

1. A lactose-removing milk process for production of milk having a lactose content between 2.7% and 3.5% w/w, comprising
    standardizing semi-skim milk to 1.4 to 2.2% w/w of fat content;
    subjecting the semi-skim milk to an ultrafiltration UF step to produce an UF permeate and an UF retentate,
    subjecting the UF permeate to a diafilteration step and a nanofiltration NF step to produce a NF permeate diafiltered and a NF retentate diafiltered, which is maintained in a concentration of from 9 to 13 degrees Bx, while the diafilteration step is performed, until recovering the same volume of UF permeate;
    mixing the NF permeate diafiltered with the UF retentate to reconstitute the milk, achieving a desired lactose, lipid and protein content;
    subjecting the reconstituted milk to an UHT process;
    enzymatically hydrolyzing remaining lactose in the reconstituted milk from the UHT process, and
    packaging the reconstituted and enzymatically hydrolyzed milk;
    wherein the reconstituted milk having been subjected to the UHT process and to the enzymatically hydrolyzing has a lactose content between 2.7% and 3.5% w/w.

2. The lactose-removing milk process for production of milk having a lactose content between 2.7% and 3.5% w/w according to claim 1, wherein the nanofiltration retentate maintains a retentate concentration 10 to 13° Bx while the diafiltration process is performed.

3. The lactose-removing milk process for production of milk having a lactose content between 2.7% and 3.5% w/w according to claim 1, wherein the UF and NF steps remove from 35 to 40% by weight of lactose.

4. The lactose-removing milk process production of milk having a lactose content between 2.7% and 3.5% w/w according to claim 1, wherein the proportions of the UF permeate and the UF retentate in the UF step are: from 55 to 63% by weight of UF retentate and from 37 to 45% by weight of UF permeate.

5. The lactose-removing milk process production of milk having a lactose content between 2.7% and 3.5% w/w production according to claim 1, wherein the proportions of the NF permeate and the NF retentate in the NF step are from 30 to 38% by weight of NF retentate and from 62 to 70% by weight of NF permeate.

6. The lactose-removing milk process production of milk having a lactose content between 2.7% and 3.5% w/w according to claim 1, wherein the nanofiltration retentate diafiltered maintains a retentate concentration from 11 to 13° Bx while the diafiltration process is performed.

7. The lactose-removing milk process for production of milk having a lactose content between 2.7% and 3.5% w/w according to claim 1, wherein the nanofiltration retentate diafiltered maintains a retentate concentration from 12 to 13° Bx while the diafiltration process is performed.

8. The lactose-removing milk process for production of milk having a lactose content between 2.8% and 3.4% w/w according to claim 1, wherein the reconstituted milk has a content from 2.8 to 3.4% w/w of lactose.

9. The lactose-removing milk process for production of milk having a lactose content between 2.9% and 3.3% w/w to claim 1, wherein the reconstituted milk has a content from 2.9 to 3.3% w/w of lactose.

10. The lactose-removing milk process for production of milk having a lactose content between 3.0% and 3.2% w/w to claim 1, wherein the reconstituted milk has a content from 3.0 to 3.2% w/w of lactose.

11. The lactose-removing milk process for production of milk having a lactose content between 2.7% and 3.5% w/w, according to claim 1, wherein the semi-skim milk is standardized to 1.4% by weight of fat content.

12. The lactose-removing milk process for lactose-free milk according to claim 1, wherein the proportions of the UF permeate and the UF retentate in the UF step are: from 56 to 62% by weight of UF retentate and from 38 to 44% by weight of UF permeate.

13. The lactose-removing milk process production of milk having a lactose content between 2.7% and 3.5% w/w according to claim 1, wherein the proportions of the UF permeate and the UF retentate in the UF step are: from 57 to 61% by weight of UF retentate and from 39 to 43% by weight of UF permeate.

14. The lactose-removing milk process for production of milk having a lactose content between 2.7% and 3.5% w/w according to claim 1, wherein the proportions of the UF permeate and the UF retentate in the UF step are: from 58 to 60% by weight of UF retentate and from 40 to 42% by weight of UF permeate.

15. The lactose-removing milk process for production of milk having a lactose content between 2.7% and 3.5% w/w according to claim 1, wherein the proportions of the NF permeate and the NF retentate in the NF step are from 31 to 37% by weight of NF retentate and from 63 to 69% by weight of NF permeate.

16. The lactose-removing milk process for production of milk having a lactose content between 2.7% and 3.5% w/w according to claim 1, wherein the proportions of the NF permeate and the NF retentate in the NF step are from 32 to 36% by weight of NF retentate and from 64 to 68% by weight of NF permeate.

17. The lactose-removing milk process for production of milk having a lactose content between 2.7% and 3.5% w/w according to claim 1, wherein the proportions of the NF permeate and the NF retentate in the NF step are from 33 to 35% by weight of NF retentate and from 65 to 67% by weight of NF permeate.

18. The lactose-removing milk process for production of milk having a lactose content between 2.7% and 3.5% w/w according to claim 1, wherein the UF and NF steps remove from 36 to 39% by weight of lactose.

19. The lactose-removing milk process for production of milk having a lactose content between 2.7% and 3.5% w/w according to claim 1, wherein the UF and NF steps remove from 37 to 38% by weight of lactose.

\* \* \* \* \*